United States Patent [19]
Cooper et al.

[11] Patent Number: 6,101,503
[45] Date of Patent: Aug. 8, 2000

[54] ACTIVE MARKUP—A SYSTEM AND METHOD FOR NAVIGATING THROUGH TEXT COLLECTIONS

[75] Inventors: James William Cooper, Wilton, Conn.; Mary Susan Neff, Montrose, N.Y.

[73] Assignee: International Business Machines Corp., Armonk, N.Y.

[21] Appl. No.: 09/033,154

[22] Filed: Mar. 2, 1998

[51] Int. Cl.[7] .................................................. G06F 17/00
[52] U.S. Cl. .............................. 707/104; 707/3; 707/102
[58] Field of Search .............................. 395/762, 200.47, 395/701; 707/100, 103, 10, 102, 3, 5, 501, 104

[56] References Cited

U.S. PATENT DOCUMENTS

| | | | |
|---|---|---|---|
| 5,708,825 | 1/1998 | Sotomayor | 395/762 |
| 5,740,425 | 4/1998 | Povilus | 707/100 |
| 5,748,594 | 5/1998 | Mauldin | 707/10 |
| 5,787,421 | 7/1998 | Nomiyama | 707/5 |
| 5,826,261 | 10/1998 | Spencer | 707/5 |
| 5,841,978 | 11/1998 | Rhoads | 395/200.47 |
| 5,848,417 | 12/1998 | Shoji et al. | 707/102 |
| 5,864,863 | 1/1999 | Burrows | 707/103 |
| 5,890,172 | 3/1999 | Borman et al. | 707/501 |
| 5,913,215 | 6/1999 | Rubinstein et al. | 707/10 |
| 5,915,251 | 6/1999 | Burrows et al. | 707/102 |
| 5,920,859 | 7/1999 | Li | 707/5 |
| 5,933,599 | 8/1999 | Nolan | 395/200.48 |
| 5,950,187 | 9/1999 | Tsuda | 707/3 |
| 5,953,732 | 9/1999 | Meske, Jr. et al. | 707/513 |
| 5,963,940 | 10/1999 | Liddy et al. | 707/5 |
| 6,031,989 | 2/2000 | Cordell | 395/701 |

OTHER PUBLICATIONS

Y. Jing and W. B. Crof, "An Association Thesaurus for Information Retrieval," Proceedings of RIAO 94, 1994, pp. 146–160.

J. W. Cooper and R. J. Byrd, "Lexical Navigation: Visually Prompted Query Expansion and Refinement," in Proceedings of the 2nd ACM Conference on Digital Libraries, 1997, pp. 237–246.

*Primary Examiner*—Wayne Amsbury
*Assistant Examiner*—Thuy Pardo
*Attorney, Agent, or Firm*—Louis J. Percello; Rabin & Champagne, PC

[57] ABSTRACT

Concepts in documents selected are identified to a user. These concepts are represented by multiple words. A search engine is used to that accesses one or more selected documents from a plurality of documents storied in one or more of the memories. Then a markup engine selects multiple-word terms in each of one or more of the selected documents. The selected words, often multiple word/concepts, are selected because they are repeated in one of the documents and because that meet grammatical criteria. After the markup engine selects the selected words, it marks each of the selected words with marker. These active markers can then be used to launch additional searches or displays of related information. Optionally, documents with the selected words are displayed to a user with the markers.

11 Claims, 8 Drawing Sheets

FIG.8

ACTIVE MARKUP— A SYSTEM AND METHOD FOR NAVIGATING THROUGH TEXT COLLECTIONS

FIELD OF THE INVENTION

This invention relates to the field of Digital Libraries. Specifically, it discloses a method for displaying documents in a collection such that major phrases become active elements of the display to assist in further searching.

BACKGROUND OF THE INVENTION

Regardless of the search technology being used, most search systems follow the same basic procedure for indexing and searching a hypermedia object database. First, the data to be searched must be input to the search system for indexing. Next, attributes and/or contents are extracted from the objects and processed to create an index. An index consists of data that is used by the search system to process queries and identify relevant objects. After the index is built, queries may be submitted to the search system. The query represents the user's information need and is expressed using a query language and syntax defined by the search system. The search system processes the query using the index data for the database and a suitable similarity ranking algorithm, and returns a hit-list of topically relevant objects. The user may then select relevant objects from the hit-list for viewing and processing.

A user may also use objects on the hit-list as navigational starting points. Navigation is the process of moving from one hypermedia object to another hypermedia object by traversing a hyperlink pointer between the objects. This operation is typically facilitated by a user interface that displays hypermedia objects, highlights the hyperlinks in those objects, and provides a simple mechanism for traversing a hyperlink and displaying the referent object. One such user interface is a Web browser. By navigating, a user may find other objects of interest.

In a networking environment, the components of a text search system may be spread across multiple computers. A computer comprises a Central Processing Unit (CPU), main memory, disk storage, and software (e.g., a personal computer (PC) like the IBM ThinkPad). (ThinkPad is a trademark of the IBM Corporation.) A networking environment consists of two or more computers connected by a local or wide area network (e.g., Ethernet, Token Ring, the telephone network, and the Internet.) (See for example, U.S. Pat. No. 5,371,852 to Attanasio et al. issued on Dec. 6, 1994 which is herein incorporated by reference in its entirety.) A user accesses the hypermedia object database using a client application on the user's computer. The client application communicates with a search server (the hypermedia object database search system) on either the user's computer (e.g. a client) or another computer (e.g. one or more servers) on the network. To process queries, the search server needs to access just the database index, which may be located on the same computer as the search server or yet another computer on the network. The actual objects in the database may be located on any computer on the network. These systems are all well known.

A Web environment, such as the World Wide Web on the Internet, is a networking environment where Web servers, e.g. Netscape Enterprise Server and IBM Internet Connection Server, and browsers, e.g. Netscape Navigator and IBM WebExplorer, are used. (Netscape Navigator is a trademark of the Netscape Communications Corporation and WebExplorer is a trademark of the IBM Corporation.)

To create an index for a text collection in a Web networking environment, the prior art often uses Web crawlers, also called robots, spiders, wanderers, or worms (e.g., WebCrawler, WWWWorm), to gather the available objects and submit them to the search system indexer. Web crawlers make use of the (physical) hyperlinks stored in objects. All of the objects are gathered by identifying a few key starting points, retrieving those objects for indexing, retrieving and indexing all objects referenced by the objects just indexed (via hyperlinks), and continuing recursively until all objects reachable from the starting points have been retrieved and indexed. The graph of objects in a Web environment is typically well connected, such that nearly all of the available objects can be found when appropriate starting points are chosen.

Having gathered and indexed all of the documents available in the collection, the index can then be used, as described above, to search for documents in the collection. Again, the index may be located independently of the objects, the client, and even the search server. A hit-list, generated as the result of searching the index, will typically identify the locations and titles of the relevant documents in the collection, and the user will retrieve those documents directly with their Web browser.

STATEMENT OF PROBLEMS WITH PRIOR ART

In most prior art search technologies, users are presented the hit list as the final output of the search process and it is up to the users to interpret the relevance of the documents returned compared to the query they entered.

In the case of the Alta Vista search engine from Digital Equipment Corporation, users have option of looking at groups of single words which may be related to the keywords in the original search, and adding them to that search.

In some prior art search systems, relationships between documents are deduced by using categorization techniques to classify documents into a previously defined hierarchy of categories.

There is no prior art known to the inventors where the search engines suggest concepts, i.e., multiword phrases, to the user or where there are multiword terms or keywords other than the original search words highlighted in the resulting documents. If concepts contained in a particular document in a hit list are to be added to the query to further refine or refocus the query, the user must discover these concepts in the document and add them to the query manually.

Generally, the prior art search systems fail to highlight terms which are not those entered by the user and the prior art also fails to convert terms into active components, e.g. hyper links or objects that launch a program, of the document display.

Generally, prior art search systems do not deduce relationships between documents based just on the common key phrases they contain.

Generally, prior art fails in relating concepts to navigation. Prior art fails because it cannot recognize concepts.

OBJECTS OF THE INVENTION

An object of this invention is an improved system and method for identifying terms to be used in refinements of search queries.

An object of this invention is the recognition and markup of multiword terms in documents where these terms may not be contained in the original query.

A further object of this invention is the activation of these terms in the user interface so that clicking on them launch programs which present related information about these terms.

A further object of this invention is a system and method for navigating through a collection of documents using multiword concepts without the necessity of refining a query manually, by simply examining terms contained in documents and documents which contain specific terms.

SUMMARY

This invention is a computer system and method for identifying concepts in a document to a user. These concepts are represented by multiple words. A search engine is used to that accesses one or more selected documents from a plurality of documents storied in one or more of the memories. Then a markup engine selects selected words in each of one or more of the selected documents. The selected words, often multiple word/concepts, are selected because they are repeated in one of the documents and because that meet a grammatical criteria. After the markup engine selects the selected words, it marks each of the selected words with marker. These active markers can then be used to launch additional searches or displays of related information. Optionally, documents with the selected words are displayed to a user with the markers.

DETAILED DESCRIPTION OF THE INVENTION

Figure 1:
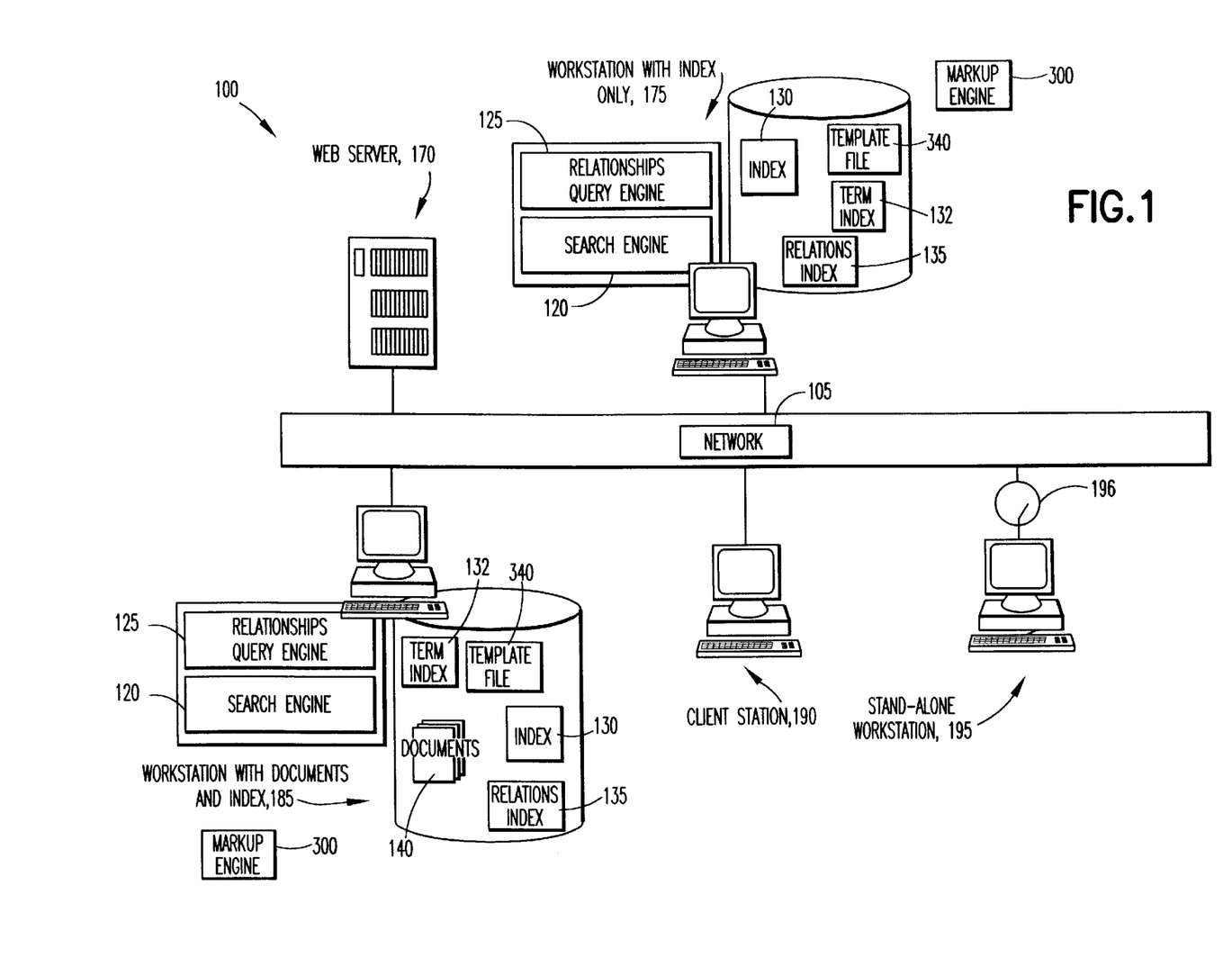
FIG. 1 is an illustration of a typical networked search system that uses the present invention.

FIG. 1 illustrates a typical networked search system. A number of computer systems and workstations (170, 175, 185, 190, 195) are attached to a network (105). Examples of general purpose computers include the IBM Aptiva personal computer, the IBM RISC System/6000 workstation, and the IBM POWERparallel SP2. (These are trademarks of the IBM Corporation.) The network (105) may be a local area network (LAN), a wide area network (WAN) or the Internet. Moreover, some of the computers in this environment may support the Web information exchange protocol (HTTP) and be part of a local Web or the World Wide Web (WWW). Some computers (e.g., 195) may be occasionally or always disconnected (196) from the network and operate as stand-alone computers.

The system consists either of a workstation (185) containing a collection of documents (140) and an index (130) of these documents (140) or of a workstation (175) containing only the indexes (130, 135) to these documents (175). Both systems utilize a search engine program (120) to search these indices and a Relations query engine (125) to search an index (135) of the relations. The system also consists of a Web server computer (170) which provide a way of viewing these documents and the links between them. The markup engine (300) is used to mark these web documents before they are returned to the user. The client workstation computers may be directly tied to the network (190) or connected occasionally (195) using dial-in or other technologies.

In this implementation the Web Server (170) provides programs, written in languages such as Java or JavaScript or both, which allow the marked terms to be displayed with active markings.

Figure 2:
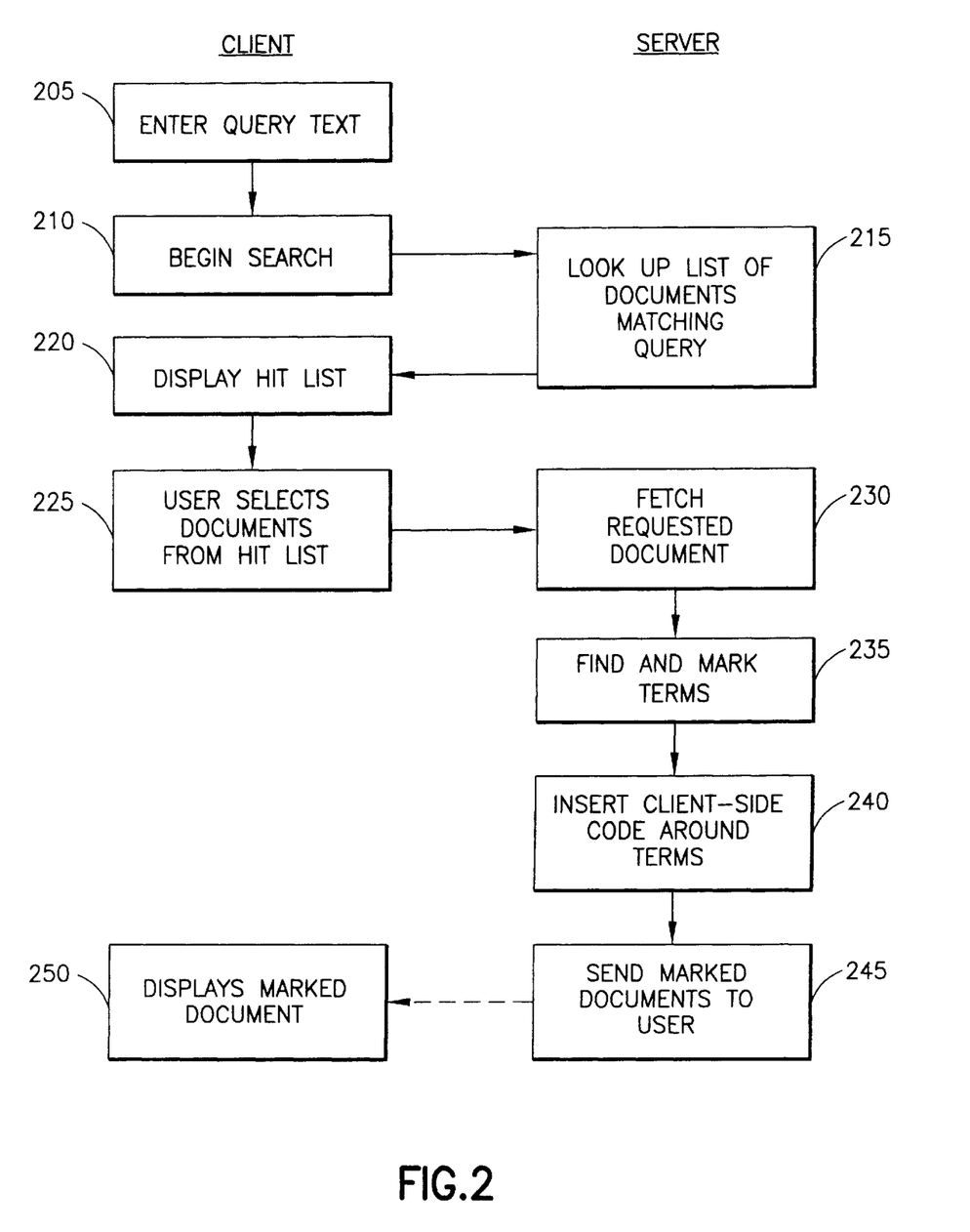
FIG. 2 illustrates the method for performing active markup of documents.

FIG. 2 illustrates one preferred implementation, where a user enters a query (205) into the search system (210) using any well known search engine. The search system looks up and ranks the relevance of a list of documents (215) and presents them to the user (220). The user then selects one or mores documents from the list (225) and requests that they be displayed. Steps 205, 210, 215, 220, and 225 are well known.

Then each document is fetched (230) and each of the multiword terms and names (235) are highlighted using the markup engine (300). In step 240, client-side code is inserted around terms in the fetched document. See example below.

Then using well known techniques, the document, now marked up, is sent 245 to the user and displayed 250 by the user.

Figure 3:
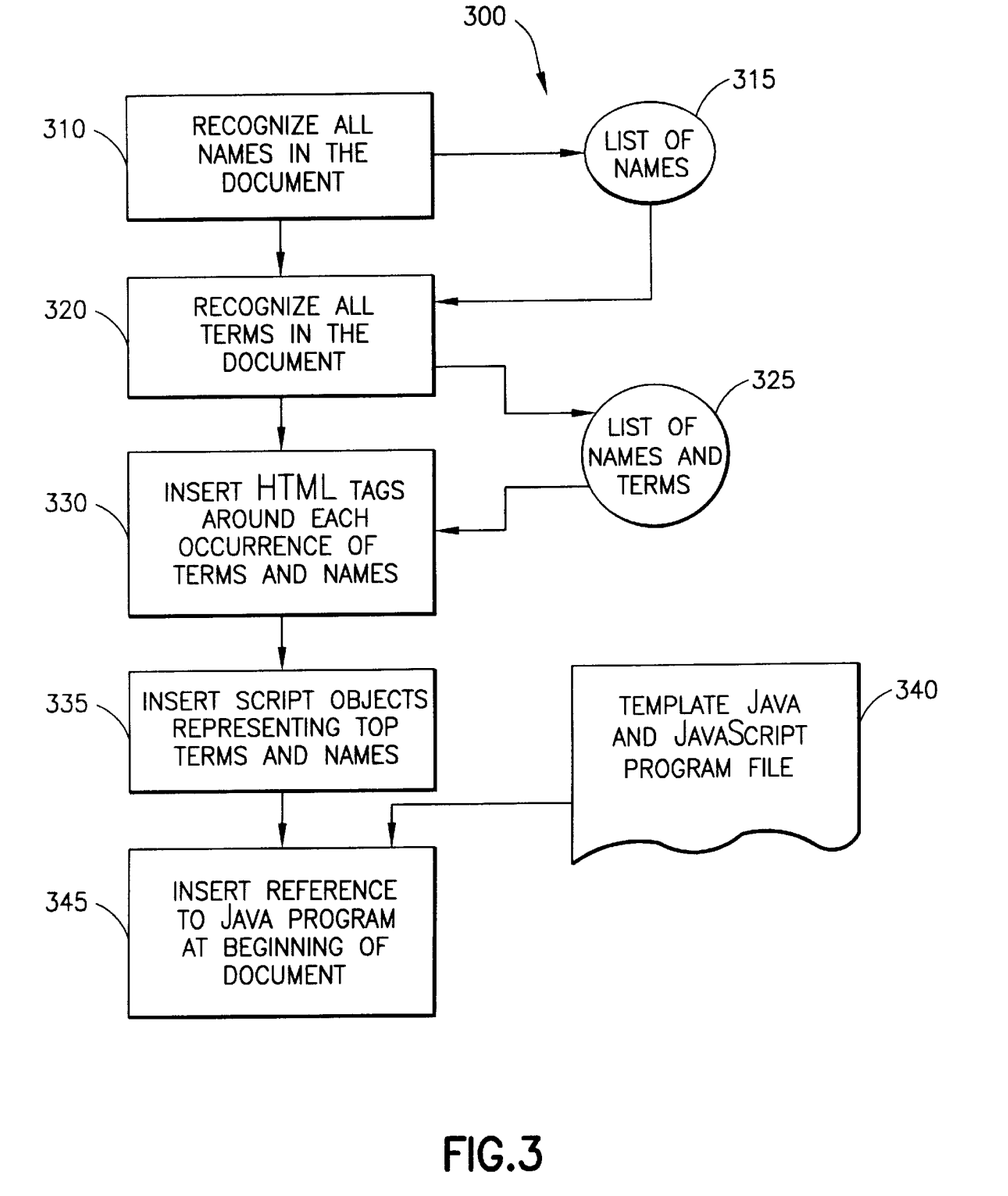
FIG. 3 illustrates the details of the markup process.

FIG. 3 illustrates how the markup engine (300) processes document text. The markup engine first recognizes all names (310) in the document and stores them in a list (315). It recognizes names using the techniques described in U.S. patent application 08/678,849 to Ravin et al. filed on Jul. 12, 1996, entitled "SYSTEM AND METHOD FOR PROCESSING NAMES IN TEXT", which is herein incorporated by reference in its entirety. The term markup system then recognizes terms in the document (320) which have not already been identified as names (315) using the techniques described in U.S. Pat. No. 5,423,032 issued to Byrd, et. al., which is herein incorporated in its entirety. In step (325) a list of these names and terms is made.

The markup engine then inserts HTML code or markers, around each of the terms on the list generated in step (325) using well known techniques. This HTML code is inserted so that the presentation of these listed terms changes in some way, e.g. a change in color, size, and/or font for each occurrence of each name and term (330) on the list. Note that the invention marks all of the terms in the fetched document that are recognized as names and/or terms. These names and/or terms are not restricted to those in the search query.

The invention then inserts form objects such as HTML radio buttons (335) at the top of the document, each labeled with one of the top-ranking terms or names in the document. While the insertion of form objects is well known, e.g. in HTML, JavaScript and other web page languages, the programming methods called from these form objects is new. These form objects are coded so that when the user clicks on one, the text of that term or phrase is passed to a JavaScript program. The JavaScript program, in turn, calls a Java program which makes a relationship query (345) to the relations index on the server.

This query results in more information about the term/name, associated with the respective form object, to be sent to the user/client. In a preferred embodiment, the markup engine (300) inserts references to Java code (345) from a template file (340) at the top of the document. (Also see template files 340 located on the server in FIG. 1.) To explain further, these form objects may be in any web page scripting language such as JavaScript and when activated, make calls to the Java or other web-page executable language programs referenced by the template file. These programs can then be used to make calls to the server to fetch and display information regarding any aspect of the marked terms. As stated above, this marked up document is returned to the user (245) through the web server (170) and displayed by a web browser program (250).

Figure 4:
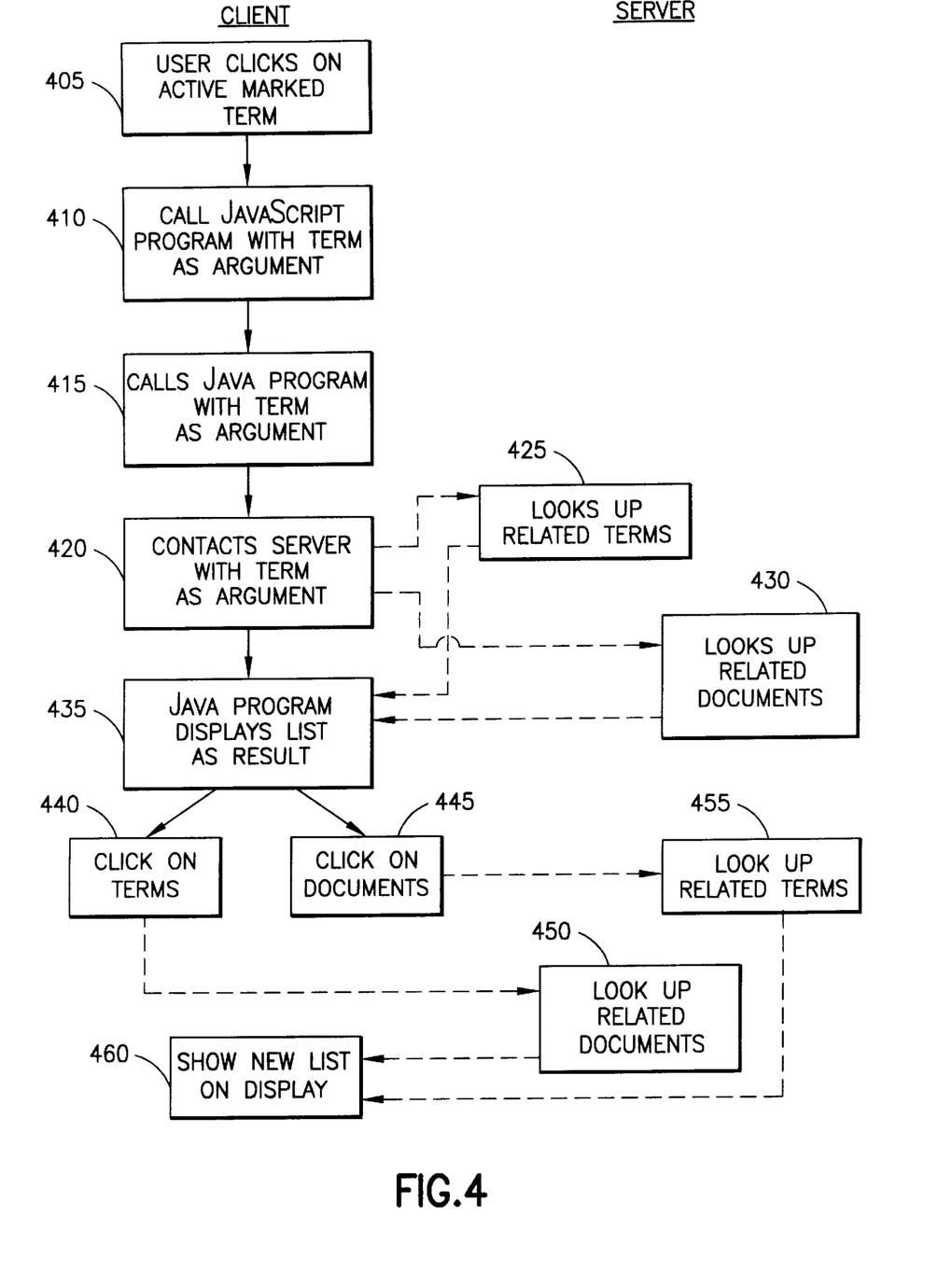
FIG. 4 illustrates how active markup initiates client and server activities.

FIG. 4 illustrates how these marked up terms behave in one preferred implementation. The user clicks on an inserted form object (405) which causes a local script program (relationship query) to be launched (410). This program in turn calls a Java program (415) passing the term as an argument. The Java program looks up either terms related to the original term (425) or other documents which contain that term (430). This is done by searching the term index (132) and the relations index (135) which has these related terms/documents indexed in a database by well known techniques.

This relations index (135) is constructed by indexing terms that occur near other terms, so that a query containing one term will return a list of terms that are near that term in any of the documents in the collection. This process is similar to one described for single words by x and y and has been described by Cooper and Byrd for multi-word terms. See Jing, Y. and Croft, W. B., "An association thesaurus for information retrieval," in Proceedings of RIAO 94, 1994, pp. 146–160 and Cooper, J. W. and Byrd, R. J., "Lexical Navigation: Visually Prompted Query Expansion and Refinement," in Proceedings of the 2nd ACM Conference on Digital Libraries, 1997, pp 237–246. These references are herein incorporated by reference in their entirety. This relations index also contains tables of all terms and the documents in which they occur so that a simple database query will allow one to determine all of the salient terms in a document or all of the documents containing a particular term.

Lists of these terms/documents, called related lists, are returned to the Java applet running in the web browser through a communication method such as Remote Method Invocation (RMI) and displayed in a list box on the client screen (435). The user can click on terms (440) to see related documents (450) or on documents (445) to see terms these documents contain (455). Either or both lists can then be displayed (435) in the client program for the user to examine further. This process can then continue as long as the user wishes to navigate through the collection using steps 440, 445, 450, 455, and 460.

Figure 5:
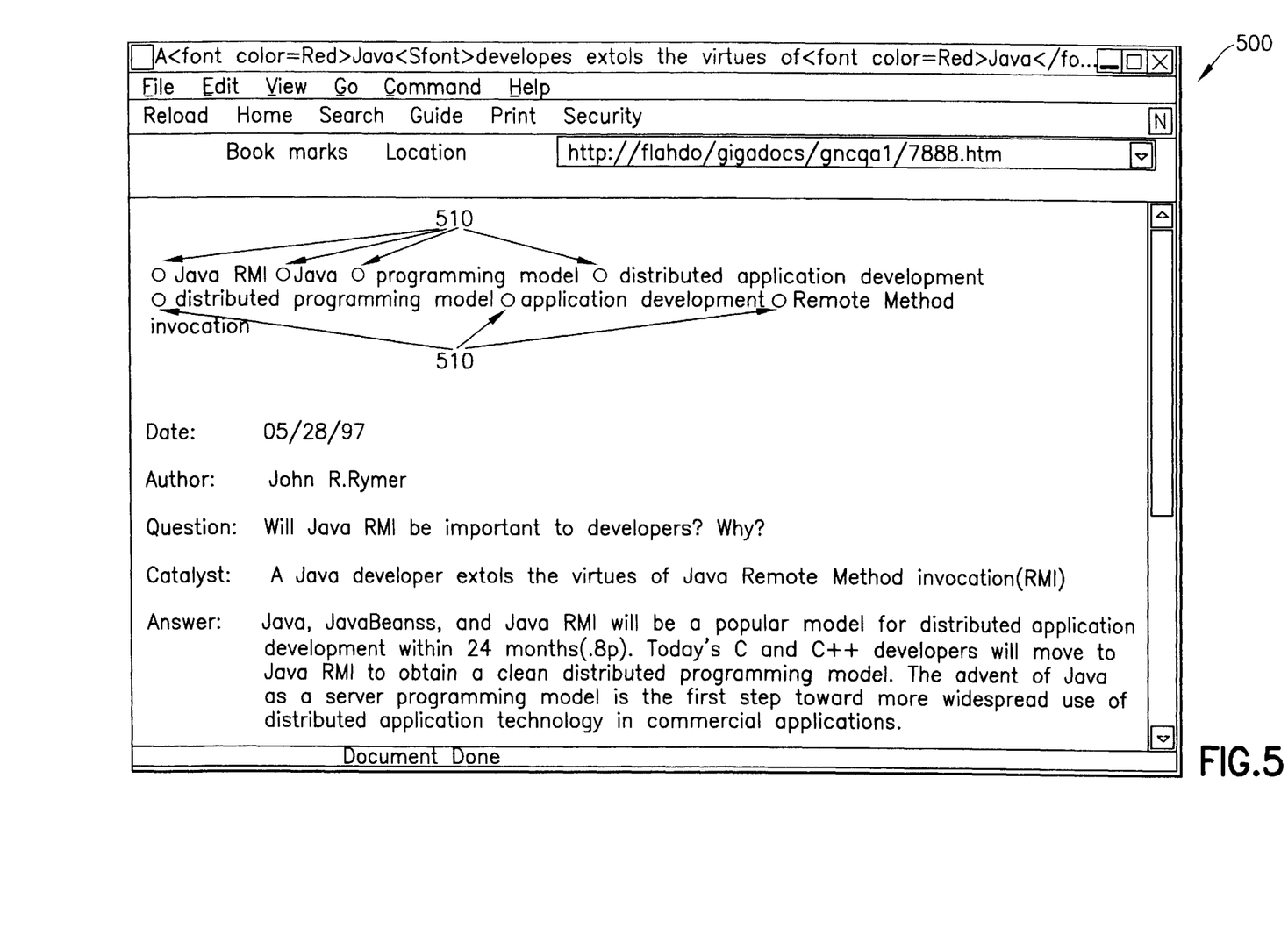
FIG. 5 illustrates a document returned showing active markup.

In a preferred embodiment, each term is an HTML form object, or display markers, typically 510, such as a Radio Button which calls the callout function when a user clicks on it. These objects are labeled with the term which is to be passed to the server for further information. HTML code for displaying these buttons is shown below:

```
<form>
    <input type="radio" name="terms"
    onclick="callout ('CDMA')"><font color=Red >CDMA</font>
    <input type="radio" name="terms"
    onclick="callout('GSM')"><font color=Red >GSM</font>
</form>
```

A typical script object is a JavaScript script program and is shown below:

```
<script>
//this function is called when the page is loaded and forms
//a link to the Java program
function onload()
{
    tlist = document.applets.termlist;    //define Java applet
}
//This function is called when the user clicks on a form
//object. This function calls the Java program, here called
"tlist"
function callout (termname)
{
    tlist.addList(termname);        //call Java applet
}
</script>
```

The Java program is then inserted within the usual HTML <applet> tag, and is loaded by the web browser when the page is loaded:

```
<applet code="tlist.class" with=300 height=400>
</applet>
```

By way of further explanation, some example scenarios are now presented.

In one proposed scenario, a user locates and views a document in a collection, and sees that the document includes a marked list of multiword terms, displayed as form objects 510, which the server has located while preparing the document for display, as shown in FIG. 5.

The marked terms, i.e. the active markup (405) such as those shown at the top of FIG. 5 are active: clicking on them triggers actions on the server which cause the display (steps 410, 415, 420, 425, 430, and 435) of various kinds of information about these terms and documents that contain these terms.

The user can then click on these terms/documents (440/445), either in this header area or wherever they occur in the document and have a display generate such information as a list of key words which have been found to co-occur near the term he clicks on. One such display is shown in FIG. 6.

This opens up a wide variety of possible interactions with indexes 135 which have been developed for that collection. For example, the user could select any of the terms in that list, i.e. related list 600, and add them to his original query, thus refining the query based on terms the search system know actually occur in the collection.

Figure 6:
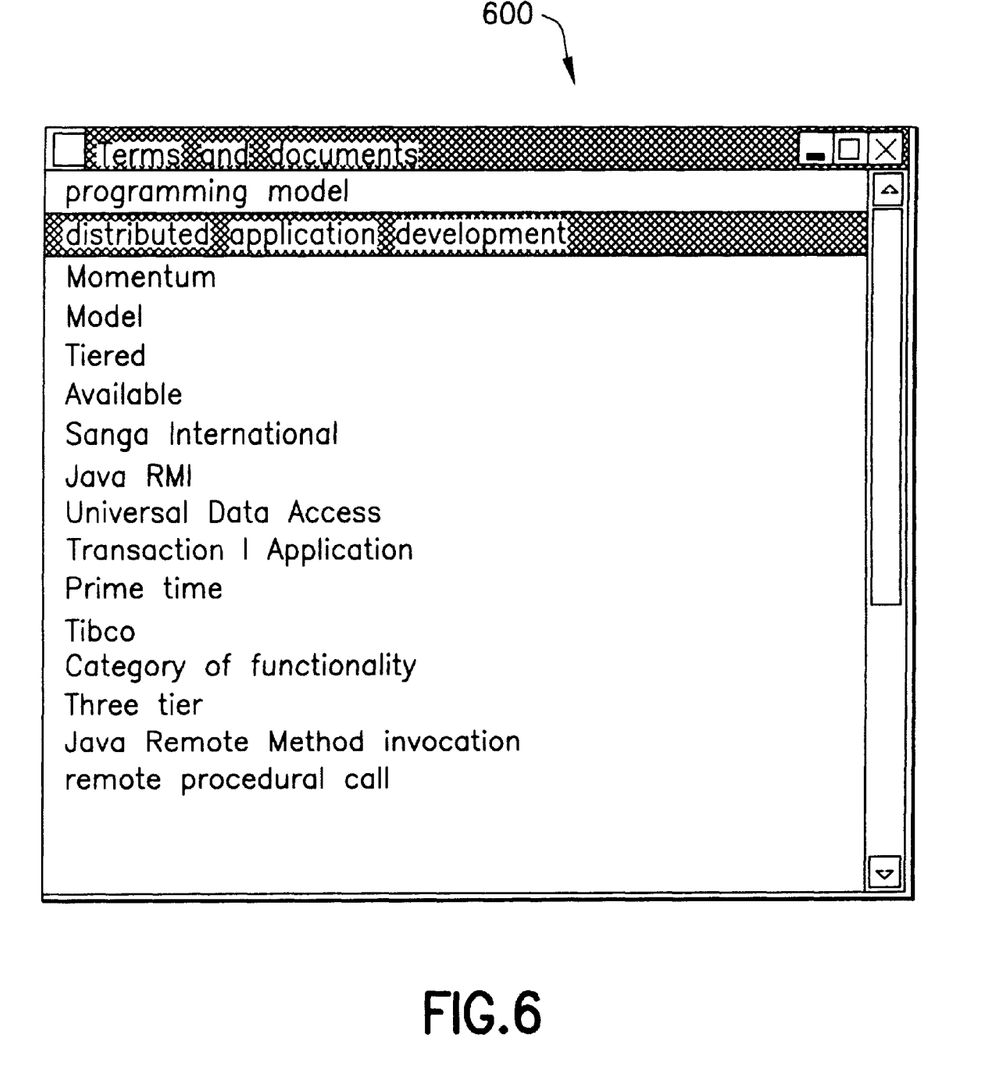
FIG. 6 shows a list of related terms returned after clicking on an active marked-up term.

In another scenario, the user could select one or more terms and ask for a display of terms related to them, as shown in FIG. 6.

Figure 7:
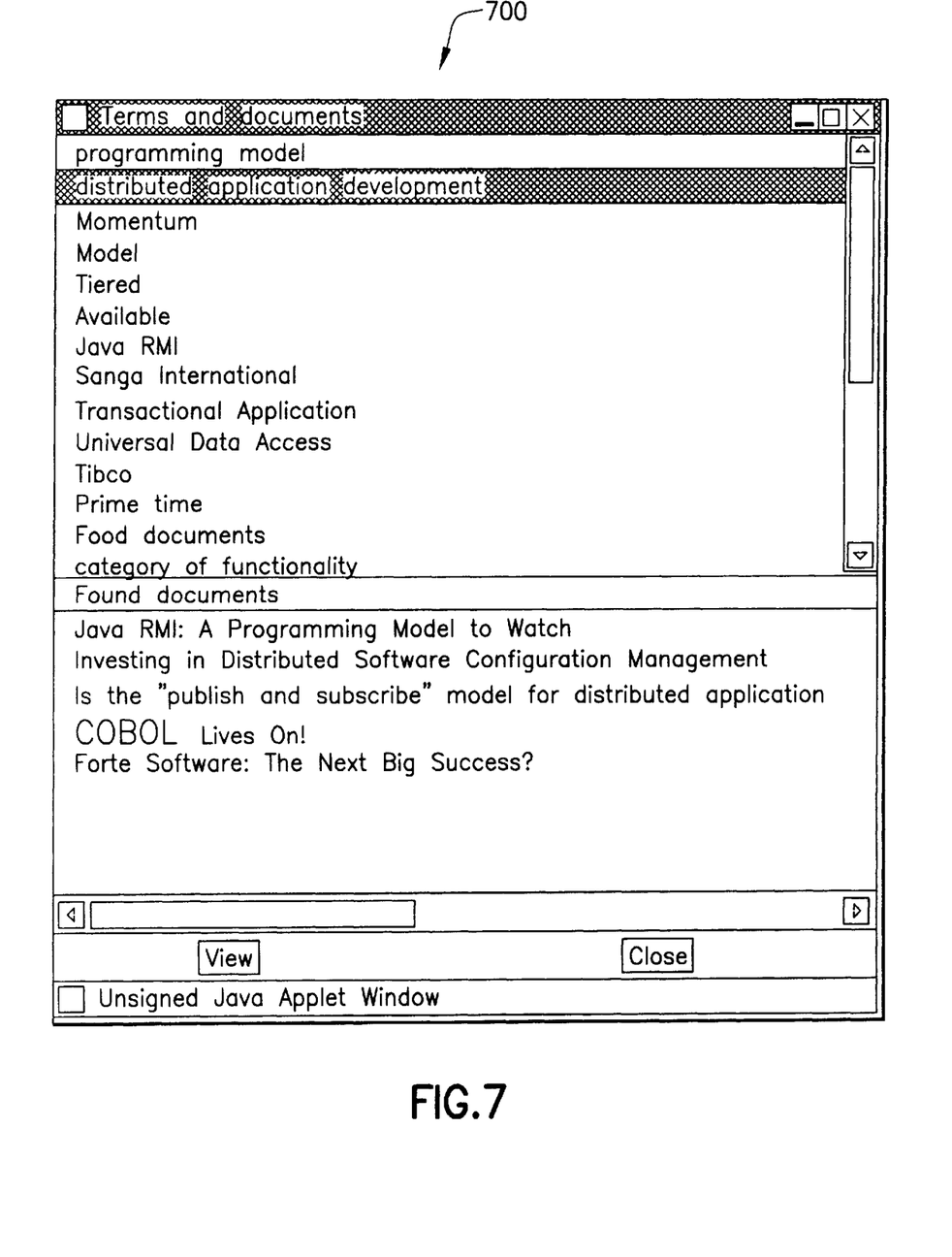
FIG. 7 shows a list of additional terms related to one term in FIG. 5.

The user could also be presented with a display of related terms with the option of seeing which documents contain those terms, as illustrated in FIG. 7.

Figure 8:
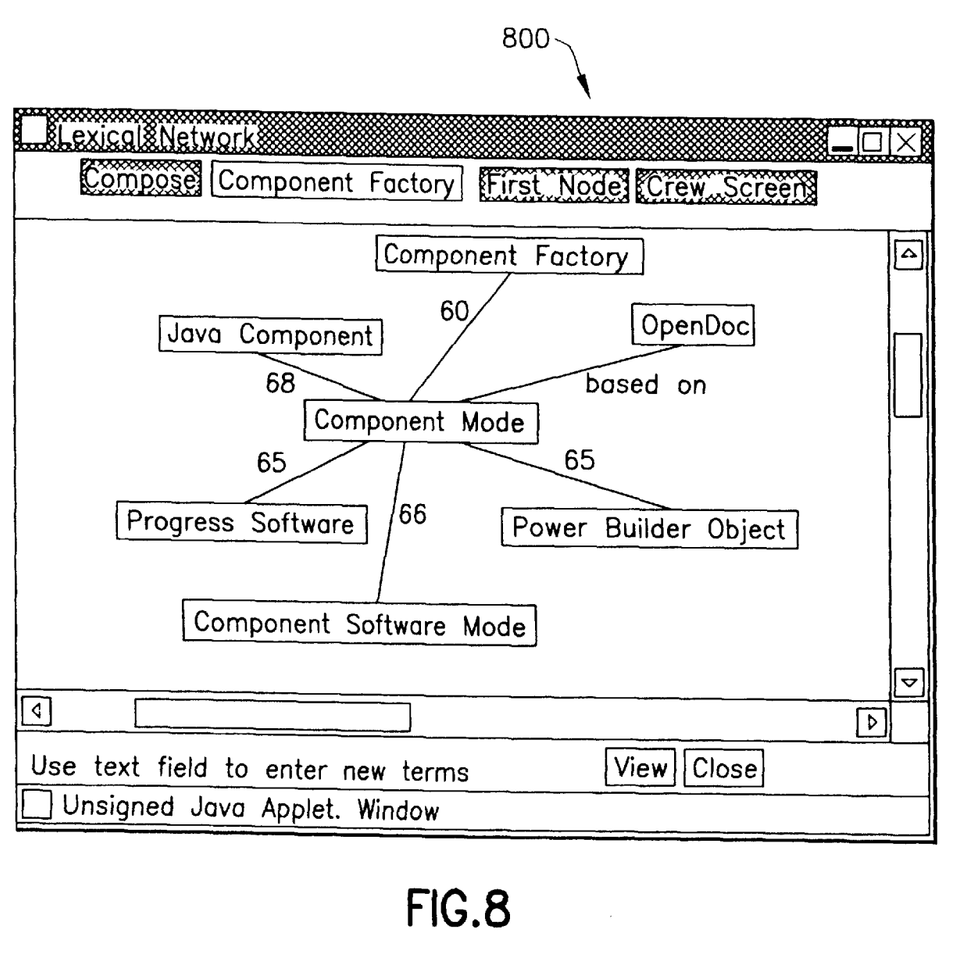
FIG. 8 shows a graphical plot of how terms are related in lexical space.

Further, the user could view these relations between terms in either a tabular fashion or in a graphical display as shown in FIG. 8.

The graphical layout of terms is the subject of U.S. patent application 09/926,871, IBM docket number Y0997-246, entitled APPLYING NUMERICAL APPROXIMATION TO GENERAL GRAPH DRAWING, filed on Sep. 10, 1997, by Wegman et. al.

Some Examples of Preferred Uses of the Invention are now given:

The ability to recognize salient terms in a document and use these terms to show related terms and documents has a wide variety of potential uses.

1. Users searching a corporate intranet for company information related to specific topics will find it useful to discover relations between products and procedures which were not specifically defined by the organizational structure. For example, documents on vacation policy and expense account instructions may both find comments on spouse travel.
2. Users of online cookbooks will find this a useful way to find recipes related to each other through key terms in a recipe. For example recipes on beef and on artichokes may both give tips on preparing Hollandaise sauce.
3. Travel agents and users of online travel guides will be able to find links to locations, hotels and restaurants which are related to the specifications of the client's original objective destination. For example hotels nearby the client's target hotel may provide restaurants or shops which are of interest to the client base on his profile.
4. Attorneys and legal assistants will find relationships between major terms in case law useful in finding related cases and precedents. For example decisions on technical issues on the computer industry may also be relevant when searching for case law on privacy issues.
5. Librarians and library users will find the terms relations that can be discovered in a collection based on the topic keywords useful in finding related reference or fictional material. Finding books which are "about" some topic but which do not have that topic in the title are a constant problem for librarians. Correlating articles, book reviews and internet discussion databases with a library's collection database can provide many more methods of linking topics such as "Vampires" and "Princeton," when the title of the novel itself contains neither of these terms. Active markup links to the collection from that discussion database make such documents easy to find.
6. Catalog sales and electronic commerce business can provide a user with methods for searching for items related to the original item that they expressed interest in. For example a user who orders computer disk drives and Internet authoring systems may be a candidate for the purchase of scanners and color printers. Such links can be derived from previous orders and presented to the telephone sales representative or on-line ordering system as a "Click here for related products" connection.

We claim:

1. A computer system for identifying concepts in a document to a user, comprising:
   one or more memories and one or more central processing units;
   a search engine, executed by one or more of the central processing units, that accesses one or more selected documents from a plurality of documents stored in one or more of the memories, the selected documents satisfying a query;
   a markup engine, executed by one or more of the central processing units, that selects multi-word terms in each of one or more of the selected documents, the selected multi-word terms being selected because they are repeated in one of the documents and because they meet a grammatical criteria, the markup engine further marking each of the selected multi-word terms with an HTML markers;
   wherein the markup engine produces a web page display of one or more of the documents on a display, displayed documents including one or more of the HTML markers as display markers, one or more of the display markers being active; and
   wherein selecting a display marker causes one or more of the following actions to occur: launching a program, initiating a second search, and accessing a second set of documents.

2. A computer system, as in claim 1, where the multi-word terms are selected because the terms are in one or more of the following grammatical criteria:
   a proper name, a proper name of a person, a proper name of a place, a proper name of an organization, a proper name of a governmental function, a proper name of a governmental law, a multi-word term, and a multi-word technical term.

3. A computer system, as in claim 1, where the marker is any one or more of the following: a highlight, a JavaScript, a web page scripting language, and an html statement.

4. A computer system, as in claim 1, where the selected multi-word terms must be repeated in the document more than a threshold number of times.

5. A computer system, as in claim 1, where the computer is connected to a network and the computer performs and one of the following functions: a server and a client.

6. A computer system, as in claim 1, where one or more of the display markers are one of the following: a hypertext link, a JavaScript object, a scripting language object, and a Java applet.

7. A computer system, as in claim 1, where one or more of the display markers accesses any one or more of the following: an advertisement, a product information document, a service, an article of manufacture, and a document with corporate information.

8. A computer system, as in claim 7, where the article of manufacture is any one of the following: a book, a consumer electronic product, and a consumer catalog sales product.

9. A computer system, as in claim 7, where the service is any one of the following: legal advice, legal research, hotel reservations, flight reservations, and restaurant and entertainment reservations.

10. A method for marking up one or more of a plurality of electronic documents selected by a search, the method comprising the steps of:
    selecting one or more words and multi-word terms in each of one or more of the selected documents, the selected words and multi-word terms being selected because they are repeated in one of the documents and because they meet grammatical criteria;
    marking each of the selected words and multi-word terms with a marker;
    displaying a web page of one or more of the documents on a display, displayed documents including one or more of the HTML markers as display markers, one or more of the display markers being active; and
    wherein selecting a display marker causes one or more of the following actions to occur; launching a program, initiating a second search, and accessing a second set of documents.

11. A computer system comprising:
    means for selecting words and multi-word terms in each of one or more selected documents, the selected words and multi-word terms being selected because they are repeated in one of the documents and because they meet a grammatical criteria; and
    means for marking each of the selected words and multi-word terms with a marker;

means for displaying a web page of one or more of the documents, displayed documents including one or more of the HTML markers as display markers, one or more of the display markers being active; and means for selecting a display marker, selecting a display marker causing one or more of the following actions to occur; launching a program, initiating a second search, and accessing a second set of documents.

* * * * *